United States Patent [19]

Ferris et al.

[11] 4,178,130
[45] Dec. 11, 1979

[54] HELICOPTER ROTOR HAVING LEAD-LAG DAMPER OPERABLE WITH PITCH AND FLAP DECOUPLING

[75] Inventors: Donald L. Ferris, Newtown; William L. Noehren, Huntington, both of Conn.

[73] Assignee: United Technologies Corporation, Hartford, Conn.

[21] Appl. No.: 849,064

[22] Filed: Nov. 7, 1977

Related U.S. Application Data

[63] Continuation of Ser. No. 674,192, Apr. 6, 1976, abandoned.

[51] Int. Cl.² ............................................. B64C 27/38
[52] U.S. Cl. ................................. 416/107; 416/140; 416/141
[58] Field of Search ............ 416/104, 106, 107, 134 A, 416/140 A, 143, 141

[56] References Cited

U.S. PATENT DOCUMENTS

| | | | |
|---|---|---|---|
| 2,638,994 | 5/1953 | Buivid | 416/106 |
| 2,640,553 | 6/1953 | Hafner | 416/106 |
| 2,755,871 | 7/1956 | Gerstenberger | 416/106 |
| 2,815,821 | 12/1957 | Echeverria | 416/106 |
| 2,853,141 | 9/1958 | Leoni | 416/106 |
| 3,212,584 | 10/1965 | Young | 416/106 |
| 3,591,310 | 7/1971 | Mouille | 416/107 |
| 4,028,000 | 6/1977 | Weiland et al. | 416/107 |

FOREIGN PATENT DOCUMENTS

598880 2/1948 United Kingdom ..................... 416/106

*Primary Examiner*—Everette A. Powell, Jr.
*Attorney, Agent, or Firm*—Vernon F. Hauschild

[57] ABSTRACT

A helicopter rotor having at least one blade projecting from the central hub and mounted for pitch change, flapping and lead-lag motion and including a lead-lag damper mounted to be pivotally movable in a selected plane and connected to the blade through a pivotal link connection to avoid the adverse effects of pitch and flap coupling.

8 Claims, 7 Drawing Figures

HELICOPTER ROTOR HAVING LEAD-LAG DAMPER OPERABLE WITH PITCH AND FLAP DECOUPLING

The invention herein described was made in the course of or under a contract or sub-contract thereunder, with the Department of the Army.

This is a continuation of application Ser. No. 674,192 filed Apr. 6, 1976, now abandoned.

BACKGROUND OF THE INVENTION

1. Field of the Invention

This invention relates to a helicopter rotor with a lead-lag damper mounted so that it is free in operation from pitch change and flapping motion of the blade.

2. Description of the Prior Art

In the helicopter rotor art, it has been conventional practice to mount the lead-lag damper in fully articulated sleeved bearing rotors so that the damper is unaffected by blade pitch change and flapping motions by connecting the opposite ends of the damper to the rotor hub and the horizontal hinge or flapping axis pin as shown in U.S. Pat. No. 3,212,584. Since each component's motion was separated by some style of sleeve or stack bearing, each component provided a single axis of motion, and flap and pitch decoupling was divorced from the lead-lag axis.

With the advent of helicopter rotors which have blades mounted from spherical elastomeric bearings, or a uniball fully articulated rotor, the lead-lag damper connected between all axis of motion experiences pitch and flap coupling as shown in U.S. Pat. No. 3,782,854.

SUMMARY OF THE INVENTION

A primary object of the present invention is to provide a helicopter rotor lead-lag damper which performs a lead-lag damping function of the rotor blade without the adverse effects of blade flap and pitch coupling.

It is a further object of this invention to mount a lead-lag damper on a helicopter rotor so that control rod loads to the blades are reduced.

It is a further object of this invention to mount a lead-lag damper on a helicopter rotor so that the damper may pivot in lead-lag motion in a selected plane relative to the hub and so that the damper is connected to the blade through a pivotable link which permits the damper to operate in the selected plane at all times, free of pitch and flap coupling from the blade.

It is still a further object of this invention to teach such a lead-lag damper connection in which the damper is connected to the helicopter blade through a pivotal link which is connected to the blade so as to be pivotable about an axis which is either parallel to, concentric with, or perpendicular to the blade pitch change axis, and which is connected to the damper through a universal joint.

DESCRIPTION OF THE PREFERRED EMBODIMENT

Figure 1:
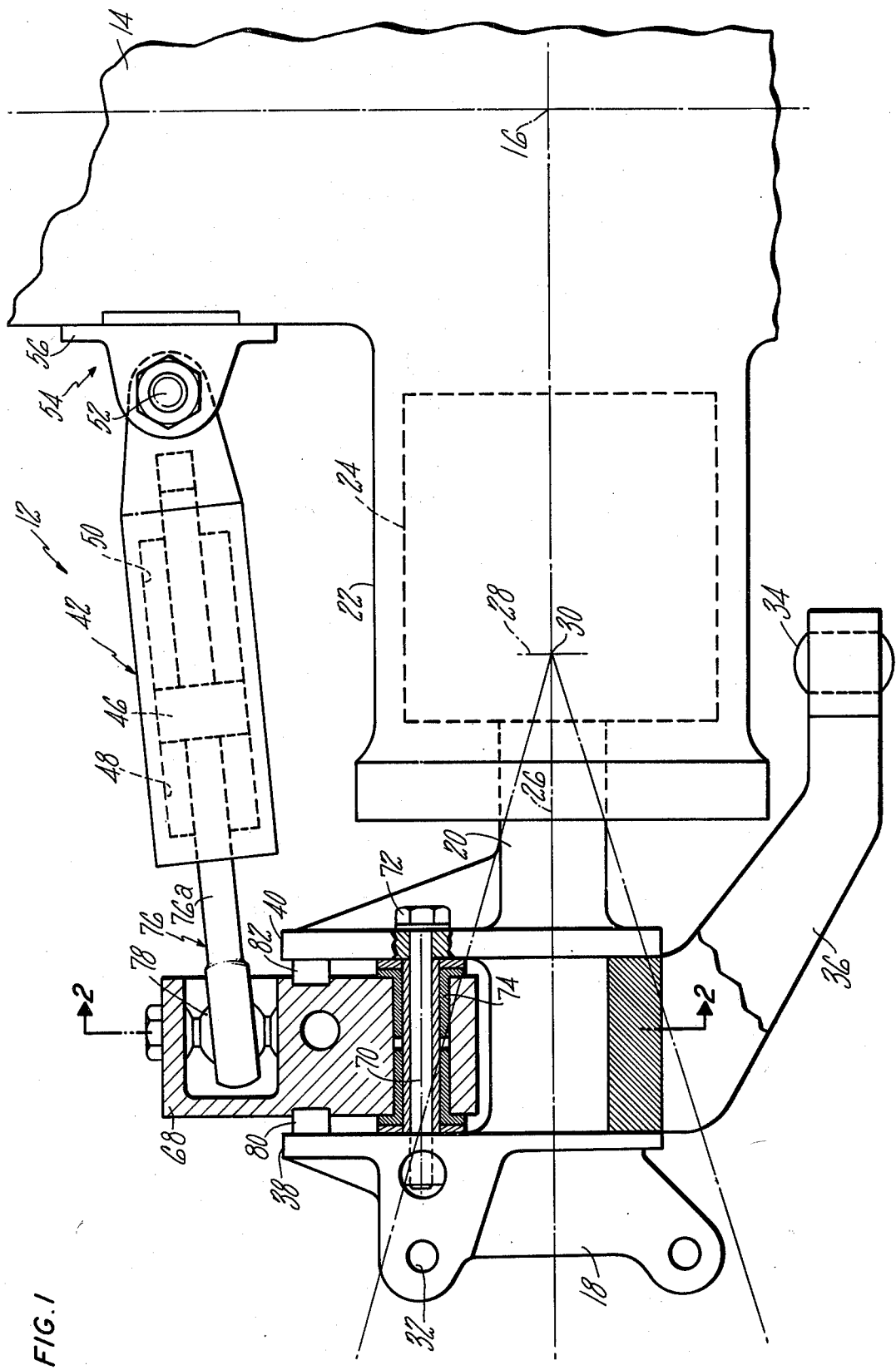
FIG. 1 is a top view, partially broken away, to illustrate a preferred embodiment of our invention.

Viewing FIG. 1 we see helicopter rotor 12 which consists of hub 14 conventionally mounted for rotation about axis of rotation 16 and blade 18 supported therefrom for rotation therewith. Blade 18 includes blade root spindle 20, which is supported from sleeve 22 of rotor hub 14 by bearing 24 so as to be movable about coincident pitch change axis 26, flapping axis 28 and lead-lag axis 30 which projects into and out of the plane of the paper. Bearing 24 is preferably of the type shown in U.S. Pat. No. 3,782,854 which serves to impart blade centrifugal loading to the hub and to permit blade motion relative to the hub about axes 26, 28 and 30, in fact, universal motion of the blade relative to the hub about the intersection of these axes. Blade 18 may be a one-piece blade or the airfoil section of the blade (not shown) may be connected to the root spindle portion 20 through connecting member 32.

Blade pitch motion is imparted to blade 18 to cause the blade to change pitch about pitch change axis 26 through control rods 34 which are connected to pitch change horn 36, which is in turn connected to the flange members 38 and 40 of root spindle 20 by conventional attachment means such as bolt arrangements 42 (see FIG. 2). in conventional fashion, as pitch rod 34 moves in and out of the plane of the paper in FIG. 1, blade 18 is caused to change pitch about pitch change or feathering axis 26. Lead-lag damper 42 consists of cylinder member 44 enveloping piston member 46 to define hydraulic damping cavities 48 and 50 on opposite sides of piston 46. Damper 42 may be of the type more fully shown in U.S. Application Ser. No. 584,238 dated June 5, 1975 on improvements in Redundant Damper Seals in the name of Robert C. Rybicki now U.S. Pat. No. 4,084,668. Lead-lag damper 42 is pivotally connected to and supported from hub 14 about pivot axis 52 by connecting member 54, which consists of bracket member 56 connected to hub 14 in conventional fashion and having flange or ear members 58 and 60 projecting therefrom so that bolt-nut member 62 may project through align holes therein and through a corresponding hole 64 in cylinder 44, and having bushing member 66 cooperating therwith to support damper 42 for pivotal motion about axis 52 so that damper 42 may pivot in a selected trajectory exclusively in a plane perpendicular to axis 52. Lead-lag damper 42 is connected to blade 18 through pivot link 68, which is pivotally connected to blade spindle 20 so as to be pivotable about axis 70, due to the cooperation of bolt-nut member 72, flanges 38 and 40 and bushing 74.

Pivotal link member 68 is also connected to damper 42, and more particularly to piston rod 76 thereof through a universal or ball joint connection 78. Thrust loads between damper 12 and spindle 20, thru damper link 68 may be reacted by bearings 74, or additional thrust bearings 80, 82 into flange members 38, 40 and used in conjunction with bearings 74. By viewing FIGS. 1, 2 and 3, it will be seen that so mounted, lead-lag damper 42 will pivot about axis 52 in a lead-lag direction exclusively in a plane perpendicular thereto and as blade 18 changes pitch around axis 26 or flaps or cones about axis 28, pivotal link 68 pivots about axis 70 to keep damper 42 connected to blade 18 but unaffected or minimally affected by pitch change and flapping motions.

Those skilled in the art will recognize that positive flapping, positive pitch and positive lag are commonly in phase, as are negative flapping, negative pitch and negative lag. Considering the former situation and viewing FIGS. 1 through 3, as increased pitch is introduced, blade 18 flaps upwardly, and axis 70 is lowered to permit damper 42 to remain in a selected plane about axis 52. This reduces the pitch moment on the positive side of the pitch range and subtracts it from the push rod load. Similarly in the case of negative flap, axis 70 rises out of the plane of the paper to permit damper 42 to remain in its selected plane. This reduces the pitch moment on the negative side of the pitch range and subtracts it from the push rod load. It will therefore be seen that link member 68 serves to connect damper 42 to spindle 20 during pitch change while permitting the damper to remain in its selected plane and not have to experience the large excursions which would otherwise be experienced at damper connection 78 if the damper were connected directly to the blade.

Figure 2:
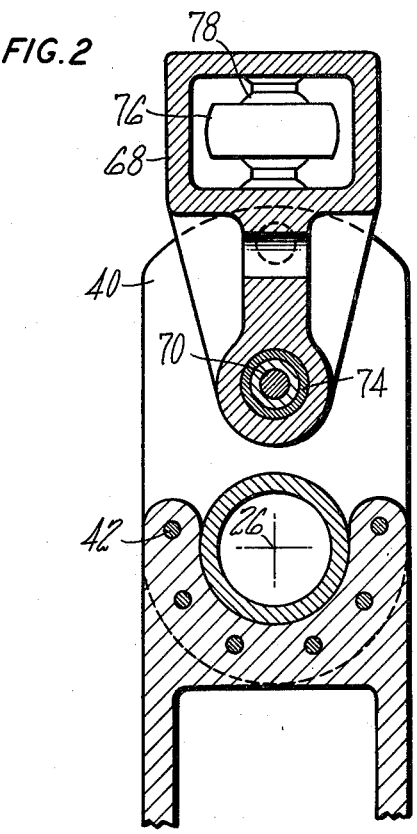
FIG. 2 is a view taken along line 2—2 of FIG. 1.
Figure 3:
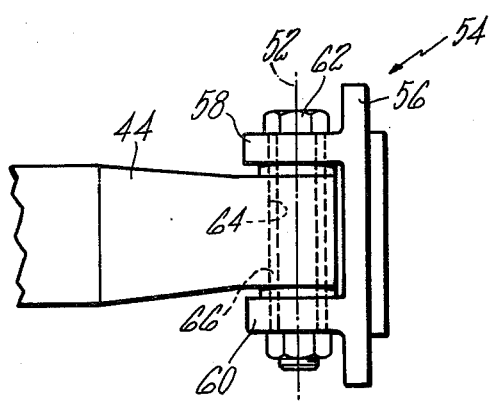
FIG. 3 is a side view of the connection between the damper and the hub in the FIG. 1 construction.
Figure 6:
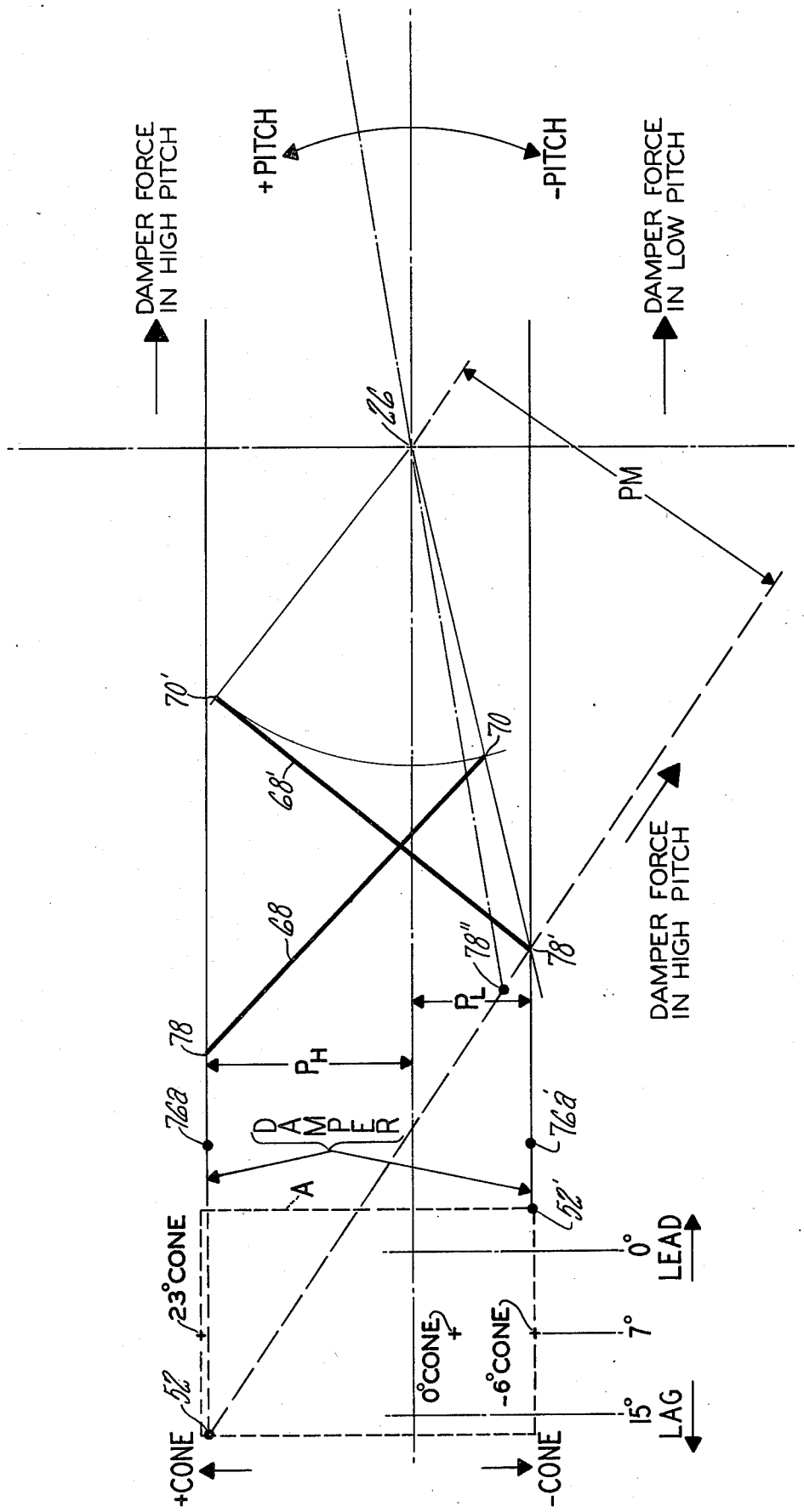
FIG. 6 is a diagrammatic showing of the operation of our lead-lag damper which illustrates the magnitude of the pitch and coupling encountered.

Now viewing FIG. 6, we will illustrate the reduced pitch coupling achieved by this FIGS. 1-3 construction. It should be borne in mind that FIG. 6 illustrates the FIG. 1 preferred embodimemt and is made so that regardless of pitch, lag or flap, the view is always taken looking down the spindle axis 26. Point 70 represents axis 70 of FIG. 1 at high pitch, while point 70' represents axis 70 of FIG. 1 at low pitch. Link 68 is illustrated in its high pitch position by line 68 and in its low position by line 68'. Line 76a represents the damper axis in relationship to spindle axis 26 in a high pitch state, line 76a' represents the damper axis in relationship to spindle axis 26 in a low pitch state. FIG. 6 represents the two worst limits of operation, namely, the highest degree of cone or flapping coupled with the highest degree of lag and the lowest degree of cone or flapping coupled with the highest degree of lag. Box A defines the displacement of the damper axis 76a, 76a' and displacement of axis 52, 52' of the damper 42 to the spindle axis 26 for all phases of lead-lag and cone. Accordingly, using FIG. 6 it is possible to define any point of cone and lead-lag.

Considering FIG. 6 further in the high pitch condition with axis 70 so indicated, link 68 extends as shown and intersects damper axis 76a and is connected to the damper outer end connection 78. The magnitude of the pitch coupling in high pitch is identified as $P_H$. Now taking the low pitch condition with axis 70 illustrated at 70', link 68 is illustrated by line 68', and damper axis 76a, link 68 is connected to the damper at point 78' and the pitch coupling can be illustrated as $P_L$. FIG. 6 further demonstrates the effect of eliminating the pivot link 68, and substituting a convention ball joint connection at both ends of the damper 12 at points 52 and 78''. The magnitude of the pitch coupling in this high pitch is identified as $P_M$. It may be seen that the magnitude is much greater than the pitch coupling $P_H$ for an identical high pitch input. In addition, the damper force is additive to the plus pitch input.

Figure 4:
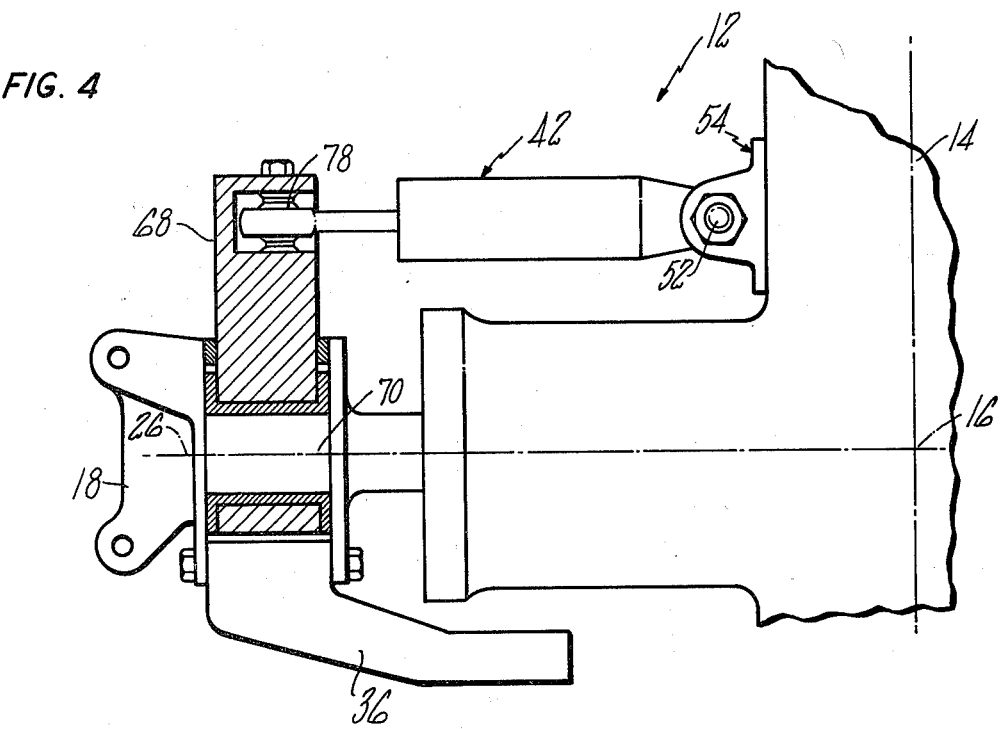
FIG. 4 is an alternate arrangement in which the lead-lag damper is connected to the blade through a linkage mechanism which is pivotally mounted about an axis concentric with the blade pitch change axis.
Figure 5:
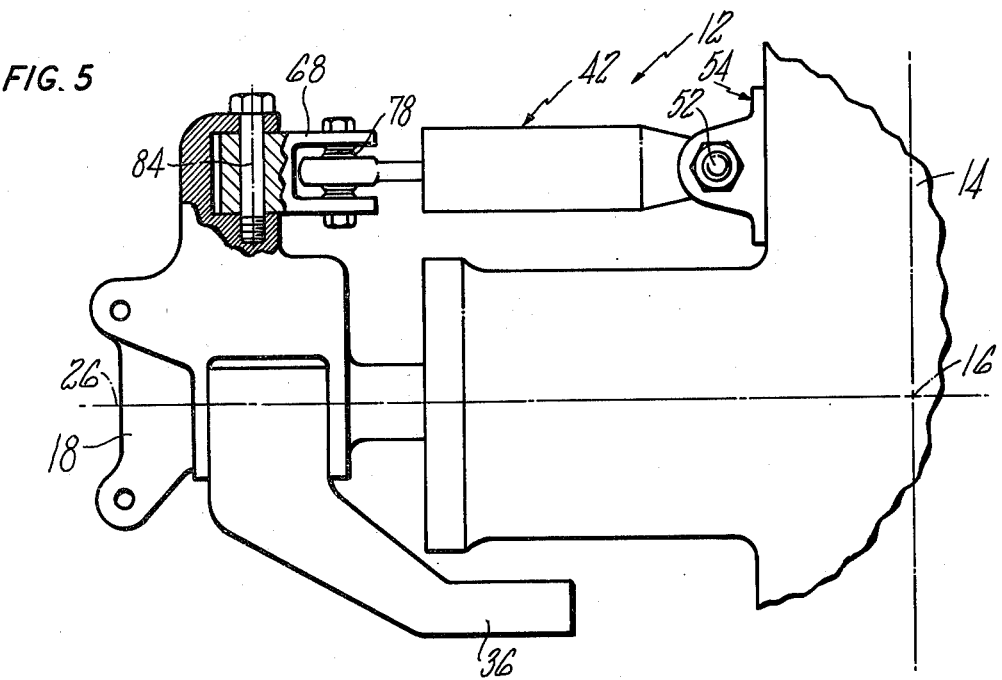
FIG. 5 is another modification of our invention in which the lead-lag damper is connected to the blade through a link which is pivotable about an axis perpendicular to the blade pitch change axis.

Referring to FIGS. 4 and 5 we see modifications of our invention and common reference numerals used in the FIGS. 1-3 modification will be utilized in describing common parts.

By viewing FIGS. 4 and 5 it will noted that rotor hub 14 rotates about axis 16 and carries blade 18 therewith and that the blade 18 is mounted in FIGS. 4 and 5 just as illustrated in FIG. 1. In FIG. 4, however, lead-lag damper 42 is again connected to the hub to be pivotable about axis 52 through connection 54 and is connected at its outboard end by universal or ball joint 78 to pivotal link 68, which is pivotally mounted at its opposite end to be pivotable about axis 70, which is coincident with pitch change axis or spindle axis 26. It will be recognized that the FIG. 4 embodiment differs from the FIG. 1 embodiment principally in that the FIG. 4 axes 70 and 26 are coincident, whereas in FIG. 1 axes 70 and 26 are parallel.

In the FIG. 5 construction, lead-lag damper is connected to hub 14 in the same fashion as in FIGS. 1 and 4 but is connected at its opposite end through ball or universal joint 78 to pivotal link 68, which is mounted at its opposite end for pivotal motion about axis 84, which is perpendicular to pitch change or spindle axis 26.

It will be evident to those skilled in the art that in each of the FIGS. 1, 4 and 5 constructions blade 18 can experience pitch change and lead-lag excursions without imparting coupling therefrom to lead-lag damper 42, but will permit damper 42 to remain in the selected plane perpendicular to axis 52 at all times.

Figure 7:
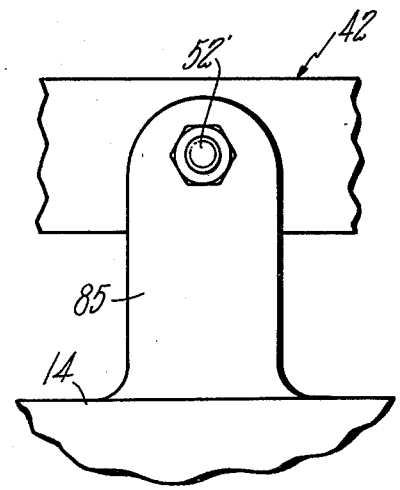
FIG. 7 illustrates an alternate mounting for the lead-lag damper.

While damper 42 is shown to be connected to hub 14 by connecting member 54 in each of FIGS. 1, 4 and 5, it will be evident to those skilled in the art that damper 42 could as well have been supported in trunnion fashion from hub 14 as illustrated in FIG. 7 wherein trunnion connection 85 supports damper 42 for pivot motion about selected axis 52' at any point along the length of cylinder 44 of damper 42. In the FIG. 7 construction, damper 42 continues to be supported for lead-lag excursion in a selected plane only.

While in our preferred embodiment, axis 52 is perpendicular to the plane of the paper and axis 26, it will be evident to those skilled in the art that axis 52 could well be canted selectively to further minimize the effect of pitch coupling $P_H$ and $P_L$, as defined in FIG. 6, for any required steady flight or potential ground resonance condition.

While we have shown damper 42 on the opposite side of blade 18 from the pitch horn 36 in each of the embodiments illustrated, it will be evident to those skilled in the art that it could as well be positioned on the same side as the pitch horn 36.

We wish it to be understood that we do not desire to be limited to the exact details of construction shown and described, for obvious modifications will occur to a person skilled in the art.

We claim:

1. A helicopter rotor including:
    1. a hub mounted for rotation about an axis of rotation,
    2. at least one helicopter blade projecting from said hub and having an inboard end adjacent the hub and an outboard end away from the hub,
    3. means supporting said blade inboard end from said hub so that said blade will rotate with said hub about said axis of rotation and so that said blade is capable of universal motion with respect to said hub about intersecting lead-lag and flapping axes, and for pitch change motion with respect to said hub about a pitch change axis intersecting said lead-lag and flapping axes,
4. a lead-lag damper supported from said hub so as to be movable in pivot motion in a trajectory lying substantially in a selected plane with respect to said hub,
5. link means extending between said lead-lag damper and said blade,
6. a universal connection connecting said link means to said lead-lag damper, and
7. means pivotally connecting said link means to said blades for pivot motion therebetween about a pivot axis offset from at least one of said pitch change and flapping axes.

2. A helicopter rotor according to claim 1 wherein said pivot axis of said pivotal connecting means is offset from both said pitch change axis and said flapping axis.

3. A helicopter rotor according to claim 2 wherein said pivot axis is parallel to said pitch change axis.

4. A helicopter rotor according to claim 2 wherein said pivot axis is perpendicular to said pitch change axis.

5. A helicopter rotor according to claim 1 wherein said pivot axis is concentric with said pitch change axis and offset from said flapping axis.

6. A helicopter rotor according to claim 1 wherein said lead-lag damper is a cylinder-piston with rod mechanism with the cylinder portion thereof connected to said hub and the piston portion thereof connected to the link member.

7. A helicopter rotor according to claim 6 and including means to pivotally connect said damper cylinder to the hub.

8. A helicopter rotor according to claim 7 wherein said damper cylinder is pivotally connected to said hub at a station along the cylinder length.

* * * * *